United States Patent [19]

Ohya et al.

[11] Patent Number: 5,061,564
[45] Date of Patent: Oct. 29, 1991

[54] MAGNETIC RECORDING MEDIUM COMPRISING A POLAR GROUP CONTAINING RESIN OR COMPOUND AND A METHYL ISO ESTER LUBRICANT PREPARED FROM A METHYL ISO ACID OR METHYL ISO ALCOHOL OR BOTH

[75] Inventors: Takao Ohya; Jun Nakagawa; Satoru Hayakawa; Yasuo Nishikawa; Tsutomu Okita; Hiroshi Hashimoto, all of Kanagawa, Japan

[73] Assignee: Fuji Photo Film Co., Ltd., Kanagawa, Japan

[21] Appl. No.: 382,934

[22] Filed: Jul. 21, 1989

[30] Foreign Application Priority Data

Jul. 25, 1988 [JP] Japan ................. 63-185210
Sep. 1, 1988 [JP] Japan ................. 63-219196

[51] Int. Cl.$^5$ ............................................. G11B 23/00
[52] U.S. Cl. ................................... 428/409; 428/694; 428/695; 428/900; 428/423.1; 428/424.6
[58] Field of Search ............ 428/694, 900, 695, 423.1, 428/424.6, 409

[56] References Cited

U.S. PATENT DOCUMENTS

| | | | |
|---|---|---|---|
| 3,809,652 | 5/1974 | Brennan | 252/56 R |
| 4,600,521 | 7/1986 | Nakamura et al. | 252/62.54 |
| 4,675,250 | 6/1987 | Kanai et al. | 428/403 |
| 4,741,959 | 5/1988 | Abe et al. | 428/403 |
| 4,772,522 | 9/1988 | Kubota et al. | 428/328 |
| 4,784,907 | 11/1988 | Matsufuji et al. | 428/328 |
| 4,786,551 | 11/1988 | Ootani et al. | 428/323 |

FOREIGN PATENT DOCUMENTS 63-203335  8/1988  Japan .

*Primary Examiner*—Merrell C. Cashion, Jr.
*Assistant Examiner*—Stevan A. Resan
*Attorney, Agent, or Firm*—Sughrue, Mion, Zinn, Macpeak & Seas

[57] ABSTRACT

A magnetic recording medium is disclosed, which comprises a non-magnetic support having provided thereon a magnetic layer mainly composed of a ferromagnetic powder and a binder resin comprising (i) a polymer having at least one polar group selected from $-SO_3M^1$, $-OSO_3M^1$, $-COOM^1$,

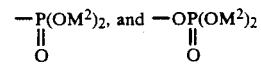

wherein $M^1$ represents a hydrogen atom, Li, Na or $NR_4$ (wherein R represents a hydrogen atom, an alkyl group, an alkenyl group, or an alkanol group), and $M^2$ represents a hydrogen atom, Li, Na, an alkyl group, or $NR_4$ (wherein R has the same significance as defined above); or (ii) a compound having at least one polar group selected from $-SO_3M^3$, $-COOM^3$, and $-PO_3(M^3)_2$ (wherein $M^3$ represents a hydrogen atom, an alkali metal, or an ammonium group) and containing at least one carbon-carbon unsaturated bond in the molecule, said magnetic layer containing at least one ester compound represented by following formula (I), (II), or (III), and when the binder resin comprises the compound (ii), the magnetic layer is irradiated by radiations:

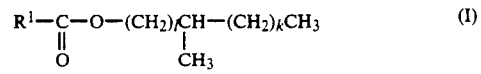

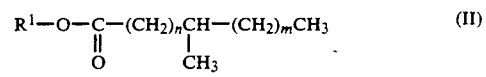

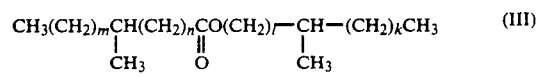

wherein $R^1$ represents a straight chain or branched alkyl group having from 7 to 29 carbon atoms or a straight chain or branched alkenyl group having from 7 to 29 carbon atoms; l, k, m, and n represents an integer; l and n each is at least 2, and the sum of n and m and the sum of k and l are from 7 to 33.

6 Claims, No Drawings

MAGNETIC RECORDING MEDIUM COMPRISING A POLAR GROUP CONTAINING RESIN OR COMPOUND AND A METHYL ISO ESTER LUBRICANT PREPARED FROM A METHYL ISO ACID OR METHYL ISO ALCOHOL OR BOTH

FIELD OF THE INVENTION

This invention relates to a magnetic recording medium having on a non-magnetic (non-magnetizable) support a magnetic layer mainly composed of a ferromagnetic powder and a binder resin or a magnetic thin layer of a ferromagnetic metal (or alloy), and more particularly to a magnetic recording medium having excellent running durability in wide temperature and humidity conditions.

BACKGROUND OF THE INVENTION

With the increase of recording density of magnetic recording, the surface property of a magnetic layer becomes more smooth, so that there occurs a problem that the coefficient of friction of the magnetic layer with each part in a recording and reproducing apparatus is increased to hinder smooth running of the magnetic recording medium and to damage the magnetic layer.

For solving the aforesaid problem, a method of adding a fatty acid ester into a magnetic layer [as described in JP-A-50-22603, JP-A-50-153905, and JP-A-55-139637 (the term "JP-A" as herein used means an "unexamined published Japanese patent application") and JP-B-39-28367, JP-B-41-18065, and JP-A-47-12950 (the term "JP-B" as used herein means an "examined published Japanese patent application")], a method of adding a silicone compound into a magnetic layer (as described in U.S. Pat. No. 2,654,681), and a method of adding a fatty acid or a hydrocarbon into a magnetic layer are proposed and attempted.

Furthermore, with the popularization of video tape recorders (VTR), personal computers, word processors, etc., the conditions, in particular, the temperature and humidity ranges in use of magnetic recording media become wider recently. Also, magnetic recording media are used in the system of repeating the on-off action of a magnetic head onto the magnetic layer in the form of rotary media such as floppy disks for personal computers and word processors, and the running durability of the magnetic recording medium under a high temperature condition or a thermocycle of from a high temperature to a low temperature for a long time becomes an important issue. However, in such conventional techniques, there are problems that the aforesaid additives are liable to vaporize from the surface of the magnetic layer at a high temperature and on the other hand, the additives deposit on the surface of the magnetic layer at a low temperature to cause clogging of a magnetic head or increasing of drop out etc. Also, when a large amount of the additive is added to the magnetic layer for obtaining the increased effect, the additive plasticizes a binder resin of the magnetic layer to deteriorate the film strength of the magnetic layer, whereby the durability thereof is reduced.

Also, as another strategy for improving the running durability of a magnetic recording medium, a method of adding abrasives (particles having high hardness) into the magnetic layer thereof is proposed and practiced. However, in order to obtain the satisfactory effect, a considerably large amount of the abrasive must be added into the magnetic layer, which results in problems such as deterioration of the electromagnetic characteristics and increase of the abrasion of a magnetic head.

For solving the aforesaid problems, a method of adding a fatty acid ester having a high molecular weight and having a branched hydrocarbon group or an unsaturated hydrocarbon group to a magnetic layer so that the additive does not deposit on the surface of the magnetic layer at a low temperature is disclosed in JP-A-58-160425, JP-A-58-218038, JP-A-60-205827, JP 61-294637, and JP-A-62-125529.

However, since these esters are in a liquid state at normal temperature, are easily compatible with the binder resin, and plasticize the binder resin, film strength of the magnetic layer is reduced and the sufficient effect is not obtained. On the other hand, the ester compounds having a straight chain alkyl group are relatively excellent in lubricating property but many of them have a high melting point, and hence the use of such ester compounds frequently causes a problem that they tend to deposit on the surface of the magnetic layer at a low temperature.

Also, as other methods for solving the aforesaid problems, a method of using a fatty acid ester having a low melting point and a fatty acid ester having a high melting point in combination is disclosed in JP-A-61-294637 and a method of using fluid paraffin and a phthalic acid ester together is disclosed in JP-B-60-49972. However, these methods are yet insufficient for solving the aforesaid problems. A magnetic recording medium having a magnetic thin layer of a ferromagnetic metal (or alloy) also suffers from the aforesaid problems, and various techniques to solve the problems are disclosed in JP-A-63-83909, JP-A-63-83921, JP-A-63-83910, and JP-A-63-234225. However, these techniques can not sufficiently improve the running durability under the recent wide environmental conditions.

On the other hand, for meeting the requirement on high density magnetic recording, it is effective to sufficiently disperse a ferromagnetic powder in a binder resin and as a useful method, a method of using a polymer having a polar functional group such as a carboxy group, a sulfonic acid group, a phosphoric acid group, etc., introduced into the molecule is disclosed in JP-A-55-44227, JP-A-57-133521, JP-A-60-238309, and JP-A-61-104329.

The aforesaid method can improve the quality of the magnetic layer of floppy disks, etc., but at the same time the improvement of the dispersibility of a ferromagnetic powder increases the smoothness of the magnetic layer so that the aforesaid problem of deteriorated running durability becomes acute and hence the advantage of the technique is not sufficiently enjoyed.

As a binder resin for magnetic recording media, there are thermoplastic resins such as a vinyl chloride-vinyl acetate copolymer, and a vinyl chloride-vinylidene chloride resin, a cellulose series resin, an acetal series resin, a urethane series resin, etc. and they are used solely or as a combination thereof. However, in the case of using these thermoplastic resins, the abrasion resistance of the magnetic layer is insufficient and can not meet the aforesaid requirement of a magnetic recording medium having an excellent running durability. On the other hand, a method of using a thermosetting resin such as a melamine resin, a urea resin, etc., or a method of adding a compound having a crosslinking property by chemical reaction, such as an isocyanate compound or a compound having an epoxy ring to the aforesaid thermoplastic resin is proposed, thereby a magnetic layer having an excellent abrasion resistance can be obtained and the requirement for the improvement of the running durability is considerably fulfilled.

However, when the aforesaid crosslinking binder is used, there occur the following problems. That is, firstly, the dispersed system of a ferromagnetic powder is poor in storage stability, thereby the coating composition for a magnetic layer can not keep the uniformity of the property and thus the magnetic recording medium obtained using the coating composition can not keep the homogeneity in the characteristics thereof. Secondly, after coating the coating composition and drying, a heat treatment step for hardening the coated magnetic layer is inevitable and also a long time is required for the hardening step.

As a means free of such problems, a method of using acrylic acid ester series oligomer and monomer and, after coating and drying, curing the layer by irradiation of radiations is disclosed in JP-B-47-12423, JP-A-47-13639, JP-A-47-150104, JP-A-50-77455, and JP-A-56-25231. By the method, magnetic recording media having good abrasion resistance is obtained without causing the aforesaid problem in production step. However, in the method, magnetic recording media having both good electromagnetic characteristics and excellent running durability suitable for high density recording are not obtained.

SUMMARY OF THE INVENTION

This invention has been made for improving the aforesaid problems in conventional techniques.

The first object of this invention is to provide a magnetic recording medium having excellent running durability under wide environmental conditions and excellent surface smoothness.

The second object of this invention is to provide a magnetic recording medium having excellent electromagnetic characteristics and also excellent running durability.

The third object of this invention is to provide a magnetic recording medium excellent in the homogeneity of the characteristics owing to good storage stability of the coating composition for the magnetic layer, which is free from a heat treatment step for curing the coated layer.

It has now been discovered that the aforesaid objects can be attained by the present invention as set forth hereinbelow.

That is, the invention provide a magnetic recording medium comprising a non-magnetic support having provided thereon a magnetic layer, wherein at least one ester compound represented by formula (I), (II) or (III) is provided in or on the magnetic layer:

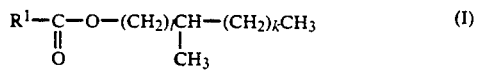  (I)

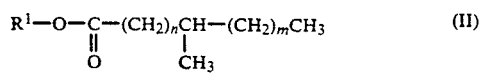  (II)

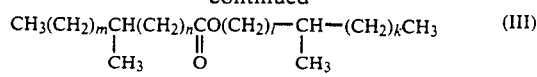  (III)

wherein $R^1$ represents a straight chain or branched alkyl group having from 7 to 29 carbon atoms or a straight chain or branched alkenyl group having from 7 to 29 carbon atoms; l, k, m, and n each represents an integer; l and n are at least 2, the sum of n and m and the sum of k and l are from 7 to 33.

The particularly preferred embodiments of this invention as follows.

(1) A magnetic recording medium comprising a non-magnetic support having provided thereon a magnetic layer mainly composed of a ferromagnetic powder and a binder resin, wherein the magnetic layer contains at least one ester compound represented by the aforesaid formula (I) and the binder resin contains a polymer having at least one polar group selected from the group consisting of $-SO_3M^1$, $-OSO_3M^1$, $-COOM^1$,

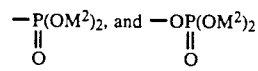

wherein $M^1$ represents H, Li, Na or $NR_4$ (wherein R represents H, an alkyl group, an alkenyl group or an alkanol group) and $M^2$ represents H, Li, Na, and alkyl group or $HR_4$ (wherein R has the same significance as defined above) (hereafter referred to as "embodiment (1)").

(2) A magnetic recording medium comprising a non-magnetic support having provided thereon a magnetic layer which is irradiated by radiations and mainly composed of a ferromagnetic powder and a binder resin, wherein the magnetic layer contains at least one ester compound shown by the aforesaid formula (I), (II) or (III) and the binder resin contains a compound having at least one polar group selected from the group consisting of $SO_3M^3$, $-COOM^3$, and $-PO_3(M^3)_2$ (wherein $M^3$ represents hydrogen atom, an alkali metal or an ammonium group) and having at least one carbon-carbon unsaturated bond in the molecule before the irradiation (hereafter referred to as "embodiment (2)").

DETAILED DESCRIPTION OF THE INVENTION

Then, the invention is described in detail.

The ester compound shown by formula (I), (II), or (III) described above has a branched structure having a branched methyl group at the alcohol residue or the acid residue, but since the branched portion(s) are the methyl group having-portion(s) only, the increase of the viscosity is less and the deterioration of the lubricating property is less at a low temperature. Also, since the carbon atom number is in a specific range and the molecule thereof has a proper size, the ester compound is reluctant to vaporize from the surface of the magnetic recording medium under a high temperature environmental condition and thus the deterioration of the lubricating property which is the deficiency of conventional ester compounds does not occur. Also, since the ester compound of this invention has the branched structure having a branched methyl group at the alcohol residue or the acid residue, the compound is reluctant to crystallize at a low temperature and the problem of depositing on the surface of the magnetic layer as white powder does not occur. Furthermore, the aforesaid ester compound has a relatively low affinity with the binder resin and gives less trouble of plasticizing the binder resin. Thus, there occurs less problem that the ester compound in the magnetic layer is cought within the binder resin and the proportion thereof acting as a lubricant on the surface of the magnetic layer is reduced.

Accordingly, the magnetic recording medium using the ester compound shown by formula (I), (II), or (III) described above has an excellent running durability under a wide environmental condition of from a high temperature to a low temperature.

The aforesaid features of the ester compound for use in this invention shown by formula (I), (II), or (III) are based on the molecular structure as described above and one of the features is in that the alcohol residue or the acid residue has a methyl branch and the ester compound has a proper size such that l and n each is at least 2 and the sum of n and m or the sum of k and l is from 7 to 33. The molecule of the aforesaid ester compound may have one position of methyl branch at the alcohol residue or the acid residue thereof. A mixture of isomers of the ester compound each having the methyl branch at the position distributed almost in accordance with normal distribution with respect to the center position of the molecule is commercially available and it is preferred to use such a mixture. Also, a mixture of the ester compounds each having the alcohol residue or acid residue of a different carbon number can be used. The sum of n and m or the sum of k and l in the aforesaid formula is from 7 to 33, and preferably from 9 to 19. If the sum of n and m or the sum of k and l is outside the range, the running durability of the magnetic recording medium is undesirably reduced.

Furthermore, in this invention, the size of the acid moiety or the alcohol moiety represented by $R^1$ of the ester compound of formula (I) or (II) is also important and the carbon atom number of $R^1$ is preferably from 7 to 21, and particularly preferably from 13 to 21. If the carbon atom number of $R^1$ is less than 7, the lubricating property is reduced and if the carbon atom number is over 29, the lubricating property is also reduced, whereby the objects of this invention can not sufficiently be attained.

The feature of this invention that a magnetic recording medium having an excellent lubricating property under a wide environmental condition is obtained is based on the specific structure of the ester compound shown by formula (I), (II), or (III) that the alcohol moiety or the fatty acid moiety has a proper carbon atom number and has a methyl branch, which has never been known as a lubricant for magnetic recording media.

A raw material alcohol for the aforesaid ester compound can be obtained by converting a methyl-branched fatty acid into the alcohol as described in *Journal of American Oil Chemical Society*, 51, 522(1974).

Specific examples of the ester compound for use in this invention shown by formula (I), (II), or (III) are isomyristyl laurate, isostearyl laurate, tetracosyl laurate, isoundecyl laurate, isopalmityl myristate, isocetyl myristate, isobehenyl myristate, isopalmityl palmitate, isostearyl palmitate, isocetyl oleate, isostearyl oleate, isocetyl stearate, isopalmityl oleate, isomyristyl stearate, isostearyl stearate, isopalmityl stearate, isobehenyl stearate, isomyristyl behenate, isostearyl behenate, isomyristyl montanate, isostearyl montanate, tetradecyl isolaurate, stearyl isolaurate, cetyl isomyristate, behenyl isomyristate, myristyl isopalmitate, stearyl isopalmitate, oleyl isopalmitate, octyl isostearate, decyl isostearate, myristyl isosterate, stearyl isostearate, behenyl isostearate, octyl isobehenate, decyl isobehenate, isotetradecyl isolaurate, isomyristyl isomyristate, isostearyl isomyristate, isobehenyl isomyristate, isomyristyl isostearate, isostearyl isostearate, isolauryl isobehenate, isocetyl isobehenate, isostearyl isobehenate, eicosenyl isostearate, isotetracosyl stearate, and isotetracosyl behenate.

In addition, the "iso" means the methyl branch and the preferred substituted position is the $\alpha$, $\beta$, or $\gamma$-position in the alcohol residue of the ester compounds of formula (I) or (III) and the $\gamma$, $\delta$ or $\epsilon$- position in the acid residue of the ester compounds of formula (II).

In the aforesaid ester compounds, isocetyl laurate, isooctyl myristate, isocetyl myristate, isocetyl palmitate, isostearyl palmitate, isooctyl palmitate, isooctyl stearate, isodecyl stearate, isotridecyl stearate, isocetyl stearate, isocetyl isostearate, oleyl isostearate, isostearyl stearate, stearyl isostearate, isostearyl isostearate, eicosenyl isostearate, isotetracosyl stearate, and isotetracosyl behenate are particularly preferred.

The amount of the aforesaid ester compound is from 0.1 to 25% by weight, preferably from 1 to 25% by weight, more preferably from 2 to 20% by weight, based on the amount of the ferromagnetic powder in the case of retaining the compound in the coating type magnetic layer. Also, in the case of retaining the ester compound on the surface of the coating type magnetic layer or the surface of the magnetic metal thin layer (i.e., providing it in the form of a so-called top coat), the amount of the compound is from 2 to 50 mg/m². If the amount of the compound is over the aforesaid range, the amount of the ester compound on the surface of the magnetic layer becomes excessive to cause not only a trouble such as sticking, etc., but also plasticize the binder resin in the case of retaining the compound in the magnetic layer, whereby the film strength of the magnetic layer is weakened to reduce the running durability. On the other hand, if the amount of the ester compound is less than the aforesaid range, a sufficient lubricating effect is not obtained.

In this invention, when the magnetic layer is a thin layer of a ferromagnetic metal or alloy, the aforesaid ester compound is usually formed on the surface of the magnetic layer as a top coat. As the method of forming the top coat, the ester compound is dissolved in an organic solvent such as a hydrocarbon ester, a ketone and an ether, and the solution is coated on the surface of a magnetic layer followed by drying. As other method, a Langmuire Projet method, etc., can be applied.

In this invention, in the case of a magnetic layer mainly composed of a ferromagnetic powder and a binder resin, as a method of retaining the ester compound in or on the magnetic layer, a method of incorporating the compound in the magnetic layer and a method of forming the compound on the surface thereof as a top coat (e.g., by way of dissolving the compound in an organic solvent and coating or spraying the solution on the magnetic layer, or dipping the base plate having the magnetic layer in a solution of the ester compound in an organic solvent to adsorb the compound on the surface of the magnetic layer, or by way of a Langmuire Projet method, etc.) can be employed.

In this invention, the aforesaid ester compound may be used together with a conventional lubricant.

Examples of the lubricant are saturated or unsaturated fatty acids (such as myristic acid, stearic acid, oleic acid, etc.), metal soaps, fatty acid amides fatty acid esters other than the ester compounds for use in this invention described above (such as various kinds of mono-esters, fatty acid esters of polyhydric esters such as sorbitol, glycerol, etc., and esterified products of polybasic acids), higher aliphatic alcohols, monoalkyl phosphates, dialkyl phosphates, trialkyl phosphates, paraffins, silicone oils, animal and vegetable oils, mineral oils, higher aliphatic amines, fine powders of inorganic substances such as graphite, silica, molybdenum disulfide, tungsten disulfide, etc.; fine powders of resins such as polyethylene, polypropylene, polyvinyl chloride, an ethylene/vinyl chloride copolymer, polytetrafluoroethylene, etc.; α-olefin polymers; unsaturated aliphatic hydrocarbons which are in liquid state at normal temperature; fluorocarbons, etc.

The preferred amount of the aforesaid lubricant depends upon the using mode thereof but is usually from 1/10 to twice the amount of the ester compound for use in this invention There is no particular restriction on the ferromagnetic powder which is used for the magnetic layer mainly composed of the ferromagnetic powder and a binder resin in this invention. For example, there are a ferromagnetic alloy powder, $\gamma$-$Fe_2O_3$, $Fe_3O_4$, Co-modified iron oxide, $CrO_2$, iron nitride, modified barium ferrite, modified strontium ferrite, etc.

There is no particular restriction on the form of the ferromagnetic powder but the ferromagnetic powder of an acicular form, a granular form, a die-like form, a rice grain form, a tabular form, etc., is usually used. The specific surface area of the ferromagnetic powder is preferably at least 10 $m^2/g$ from the view point of the electromagnetic characteristics. The acicular ratio of ferromagnetic iron oxide or chrominum dioxide is from about 2/1 to 20/1, and preferably at least 5/1 and the mean length thereof is in the range of from 0.1 to 2.0 μm.

In the aforesaid ferromagnetic powders, a Co-modified iron oxide powder and a ferromagnetic alloy powder are preferred for the objects of this invention. In particular, the ferromagnetic alloy powder is preferably the powder of an alloy of Fe and a metal such as Co, Ni, etc., wherein the metal content is at least 75% by weight, at least 80% by weight of the metal content is a ferromagnetic metal (i.e., Fe, Co, Ni, Fe-Ni, Co-Ni, Fe-Co-Ni), the long diameter is less than about 1.0 μm, the coercive force Hc is at least 800 Oe, the saturation magnetization ($o_s$) is at least 100 emu/g, the particle size is at least 30 $m^2/g$ in specific area, and the acicular ratio is at least 8.

In this invention, the particularly effective ferromagnetic powder is a ferromagnetic alloy powder having a crystal size of less than 400 Å, and preferably less than 200 Å.

The binder for forming the magnetic layer can be selected from ordinary binders. Examples of the binder are a vinyl chloride/vinyl acetate copolymer, a copolymer of vinyl chloride, vinyl acetate, and vinyl alcohol, maleic acid and/or acrylic acid, a vinyl chloride/vinylidene chloride copolymer, a vinyl chloride/acrylonitrile copolymer, an ethylene/vinyl acetate copolymer, cellulose derivatives (such as nitrocellulose resin), acryl resins, polyvinyl acetal resins, polyvinyl butyral resins, epoxy resins, phenoxy resins, polyurethane resins, and polycarbonate resins.

The aforesaid polymer binders can be used solely or a mixture thereof and is frequency subjected to a curing treatment by adding thereto a known isocyanate series crosslinking agent.

Also, the ester compound for use in this invention ca be applied to a binder system of acrylic acid ester series oligomer and monomer as the binder components and curing them by the irradiation of radiations.

In one of the preferred embodiment (embodiment (1)) of this invention, a polymer having at least one of the following polar groups is used as the binder resin together with the ester compound of formula (I) described above;

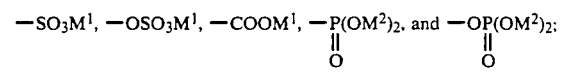

wherein $M^1$ represents a hydrogen atom, Li, Na, K, $NR_4$ (wherein R represents a hydrogen atom, an alkyl group preferably having up to 22 carbon atoms (e.g., methyl, ethyl, propyl), an alkenyl group preferably having up to 22 carbon atoms (e.g. oleyl), or an alkanol group preferably having 1 to 3 carbon atoms (e.g., ethonal) and $M^2$ represents a hydrogen atom, Li, Na, K, an alkyl group as defined above or $NR_4$ (wherein R is same as defined above).

Then, the embodiment (1) is explained in detail.

As the polymer having the aforesaid polar group, polyurethane resins, vinyl chloride copolymers, and polyester resins are preferred and they can be used as a combination thereof. They can be used solely or as a combination of them. The aforesaid polar group is preferably introduced into the polymer in the range of from $10^{-6}$ to $10^{-3}$ equivalent, and more preferably from $10^{-5}$ to $10^{-4}$ equivalent per gram of the polymer. The polymer preferably has a number average molecular weight of from 10,000 to 100,000.

As the binder resin for forming the magnetic layer in the embodiment (1) of this invention, a thermoplastic resin, a thermosetting resin, and a reaction type resin can be used in addition to the aforesaid polymer having the polar group.

As the thermoplastic resin, the resin having a number average molecular weight of from 10,000 to 200,000 and a polymerization degree of from about 200 to about 2,000 is generally used. Examples of such a thermoplastic resin are vinyl chloride/vinyl acetate copolymer resins (e.g., vinyl chloride/vinyl acetate copolymer and vinyl chloride/vinyl acetate/vinyl acetate copolymer and vinyl chloride/vinyl acetate/vinyl alcohol copolymer), vinyl chloride/vinylidene chloride, copolymer, acryl resins (e.g., vinyl chloride/acrylonitrile copolymer, vinylidene chloride/acrylonitrile copolymer, acrylic or methacrylic (hereafter collectively referred to as "(meth)acrylic") acid ester/acrylonitrile copolymer, (meth)acrylic acid ester/vinylidene chloride copolymer, (meth)acrylic acid ester/styrene copolymer, and butadiene/acrylonitrile copolymer), cellulose derivatives (e.g., cellulose acetate butyrate, cellulose diacetate, cellulose triacetate, cellulose propionate, cellulose acetate propionate, nitrocellulose, and cellulose acetate), various synthetic rubber series thermoplastic resins (e.g., polybutadiene, chloroprene, polyisoprene, and styrene/butadiene copolymer), polyurethane resins, polyvinyl fluoride, polyamide resins, polyvinyl butyrate, styrene/butadiene copolymer, and polystyrene resins. They can be used solely or as a mixture thereof.

As the thermosetting resin or the reaction type resins, the resin having a number average molecular weight of less than 200,000 in a state of a coating composition but increasing the molecular weight almost infinitely by a condensation reaction or an addition reaction after coating is generally used. In the case of the thermoplastic resin, the resin which is not softened or dissolved by heating in the step of curing is preferred. Examples of such a resin are phenol/formalin/novolk resins, phenol/formalin/resol resins, phenol/furfural resins, xylene/formalin resins, urea resins, melamine resins, drying oil-modified alkyd resins, phenol resin-modified alkyd resins, maleic acid-modified alkyd resins, unsaturated polyester resins, a combination of an epoxy resin and a curing agent (e.g., polyamine, an acid anhydride, a polyamide resin), treminal isocyanate polyether humidity curing type resins, polyisocyanate prepolymers (e.g., a compound having at least 3 isocyanate groups in the molecular, which is a reaction product of diisocyanata and a low molecular weight polyol, and a trimer or tetramer of diisocyanate, and resins having a polyisocyanate prepolymer and active hydrogen (e.g., polyester polyol, polyether polyol, acrylic acid copolymer, maleic acid copolymer, and p-hydroxystyrene copolymer).

They can be used singly or as a mixture thereof.

The aforesaid polymer having the polar group is preferably used as a mixture with the polyisocyanate prepolymer (polyisocyanate compound), whereby the magnetic layer formed becomes tough and the running durability is improved.

The amount of the aforesaid polymer having the polar group is generally not less than 10% by weight, and preferably not less than 15% by weight based on the total weight of the binder resin.

According to the embodiment (1) of this invention, the aforesaid polar group existing in the binder has a large absorptive property to the surface of the ferromagnetic powder and hence the polymer having the polar group strongly adsorbs on the surface of the ferromagnetic powder in the magnetic coating composition, whereby the dispersion of the ferromagnetic powder is accelerated and the stability of the dispersion is ensured to provide a magnetic recording medium having the magnetic layer of high smoothness. Also, the surface roughness of the magnetic layer in this invention can be reduced below 100 n.m. in the center line average roughness Ra (cut off valve (0.25 $\mu$m) by a light interference method and the value can sufficiently meet the requirement by, for example, a video floppy disks or a high density floppy disk the development of which is expected.

In general, as the surface of a magnetic layer becomes smoother, the running durability is more deteriorated and the tendency becomes more sever under a high-temperature condition. Conventional techniques can not solve the aforesaid problems. On the other hand, in this invention, even when the surface of the magnetic layer becomes very smooth, e.g., below 100 n.m. in center line average roughness Ra, by the aforesaid binder resin containing the polymer having the polar group in the molecule, the running durability of the magnetic recording medium can be sufficiently secured by the effect of the ester compound shown by formula (I) described above.

In a still other preferred embodiment (embodiment (2)) of this invention, the magnetic recording medium has a magnetic layer contains a compound having at least one polar group selected from $-SO_3M^3$, $-COOM^3$, and $-PO_3(M^3)_2$ wherein $M^3$ represents a hydrogen atom, an alkali metal (e.g., Na, K, and Li), or an ammonium group and containing at least one carbon-carbon unsaturated bond in the molecule as the binder resin together with at least one ester compound shown by formula (I), (II), or (III) described above, the magnetic layer being further irradiated by radiations.

Then, the embodiment (2) is explained in detail.

As the compound having at least one polar group selected from $-SO_3M^3$, $-COOM^3$, and $-PO_3(M^3)_2$ and containing at least one carbon-carbon unsaturated bond in the molecule, which is used in this embodiment, copolymers such as vinyl chloride series copolymers, vinyl chloride/vinyl propionate series copolymers, vinyl chloride/vinyl acetate series copolymers, vinylidene chloride/vinyl acetate copolymers, etc., or polyurethane series resins each having at least one polar group such as $-COOH$, $-COONa$, $-COONH_4$, $-SO_3Na$, $-SO_3K$, $-OPO_3Na$, $-OPO_3H_2$, $-OPO_3(NH_4)_2$, $-PO_3Na_2$, and $-PO_3H_2$ and containing at least one carbon-carbon unsaturated bond are preferred.

The particularly preferred polar groups are $-COOH$ and $-SO_3Na$, and the content of the polar group is preferably from about $10^{-}$ to $10^{-3}$ equivalent, more preferably from $10^{-6}$ to $5 \times 10^{-4}$ equivalent, and most preferably from $10^{-5}$ to $2 \times 10^{-4}$ equivalent per gram of the polymer.

If the content of the polar group is outside the aforesaid range, the dispersibility of the ferromagnetic powder becomes poor and also the electromagnetic characteristics of the magnetic recording medium are greatly reduced.

As the carbon-carbon unsaturated bond, there are an acrylate residue, a terminal vinyl residue, and a residue of an unsaturated acid such as maleic acid, etc., and the bond may be at a side chain or at the terminal of the main chain.

The content of the unsaturated bond is preferably from $10^{-5}$ to $10^{-3}$ equivalent per gram of the polymer. If the content of the unsaturated bond is outside the range, the curing property of the binder resin becomes inferior or the durability is reduced.

The number average molecular weight of the polymer as the binder resin is from 3,000 to 50,000, and preferably from 8,000 to 30,000. If the molecular weight is less than 3,000, the magnetic layer of the magnetic recording medium formed becomes too strong and hence when the magnetic recording medium is bent, the magnetic layer is liable to be cracked or the magnetic recording medium is liable to be curled by curing shrinkage after the irradiation of radiation. On the other hand, the molecular weight is over 50,000, the solubility of the polymer in a solvent becomes poor and hence not only handling becomes inconvenient but also the dispersibility of the ferromagnetic powder is reduced and a large energy is required for curing. Also, the durability and running property of the magnetic recording medium formed are unpreferably reduced.

As a polyvinyl chloride series copolymer which is used as a base for the aforesaid polymer, there are, for example, a vinyl chloride/vinyl acetate copolymer, vinyl chloride/vinyl acetate/maleic acid copolymer, a vinyl chloride/vinyl acetate/vinyl alcohol copolymer, a vinyl chloride/vinyl acetate/maleic acid/vinyl alcohol copolymer, a vinyl chloride/vinyl propionate/vinyl/maleate copolymer, a vinyl chloride/vinyl propionate/vinyl alcohol copolymer, a vinylidene chloride/vinylacetate/maleic acid copolymer, a vinylidene chloride/vinyl propionate/vinyl alcohol copolymer, a vinyl chloride/vinyl acetate/acrylic acid copolymer, a vinyl chloride/vinyl acetate/acrylic acid/vinyl alcohol copolymer, etc., and the saponified products of these copolymers.

A carbon-carbon unsaturated bond can be introduced into the copolymer by modifying a part of the hydroxy groups or the carboxy groups of the copolymer or a part of the hydroxy groups of the saponification product of the copolymer. For example, the introduction of the carbon-carbon unsaturated bond can be practiced by a method of reacting a compound having an epoxy ring and a carbon-carbon unsaturated bond, such as glycidyl acrylate with a part of the hydroxy groups of a copolymer which is used as a base for the polymer for use in this invention or a method of reacting a part of the hydroxy groups or the carboxy groups of the copolymer with one NCO group of a polyfunctional isocyanate and then reacting the remaining NCO groups with an active hydrogen-containing compound having an acryloyl or methacryloyl (hereinafter, collectively referred to as "(meth)acryloyl") group, such as (meth)acrylic acid, hydroxyalkyl (meth)acrylates (e.g., 2-hydroxyethyl (meth)acrylate, 2-hydroxypropyl (meth)acrylate, 2-hydroxybutyl (meth)acrylate, etc.), or (meth)acrylamide, N-methylol(meth)acrylamide, etc.).

Also, as a method for introducing a polar group, the following methods can be employed.

That is, the introduction of a polar group can be performed by reacting a part of the hydroxy groups or the carboxy groups of the copolymer which is used as a base for the polymer of this invention or a part of the hydroxy groups formed by saponifying the copolymer with one NCO group of a polyfunctional isocyanate and then reacting the remaining NCO groups with a hydroxyl compound containing $CO_2M^3$ group, $SO_3M^3$ group, or $OPO_3M^3$ group (wherein $M^3$ represents hydrogen, an alkali metal, or ammonium). Also, the introduction of a polar group can be performed simultaneously with the introduction of the carbon-carbon unsaturated bond. For example, a polar group can be introduced by copolymerizing glycidyl (meth)acrylate with a vinyl compound such as vinyl chloride and then adding a polar group-containing hydroxy compound to the epoxy ring of the copolymer formed.

Examples of synthesizing these resins are disclosed in JP-A-61-89207, JP-A-61-106605, JP-A-57-40744, and JP-A-59-8126 although the resins which can be used in this invention are not limited to the resins obtained by these examples.

Also, as urethane series resins having the polar group and the carbon-carbon unsaturated bond, polyesters, polyethers, polyester ethers, polycaprolactones, polycarbonates, etc., can be used as the main chain skeleton thereof. In these compounds, a polyester is most generally used.

Specific examples of a dibasic acid which is used for the polyesters are oxalic acid, malonic acid, succinic acid, glutaric acid, adipic acid, sebacic acid, dodecanedicarboxylic acid, maleic acid, fumaric acid, itaconic acid, trimethyladipic acid, hexahydrophthalic acid, tetrahydrophthalic acid, phthalic acid, isophthalic acid, terephthalic acid, and naphthalenedicarboxylic acid. Also, specific examples of the dihydric alcohol which is used for the polyesters are ethylene glycol, trimethylene glycl, tetramethylene glycol, pentamethylene glycol, hexamethylene glycol, octamethylene glycol, diethylene glycol, triethylene glycol, tetraethylene glycol, 2,2-dimethylpropane-1,3-diol, 2,2-diethylpropane-1,3-diol, cyclohexane-1,3-diol, cyclohexane-1,4-diol, cyclohexane 1,4-dimethanol, cyclo-hexane-1,3-dimethanol, 2,2-bis(4-hydroxyethoxycyclohexyl)propane, 2,2-bis(4-hydroxyethoxy-phenyl)propane, and 2,2-bis(4-hydroxyethoxyethoxy-phenyl)propane.

Also, a lactone series polyester skeleton derived from γ-butyrolactone, δ-valerolactone ε-caprolactone, etc., can be used.

Also, as the polycarbonate series skeleton, carbonic acid esters such as 1,6-hexanediol, 1,8-octanediol, 1,10-decanediol, etc., can be used.

As the isocyanate forming the urethane bond of the aforesaid urethane resin having the polar group and the carbon-carbon unsaturated bond, there are polyhydric isocyanates such as 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3-dimethylphenylene diisocyanate, 4,4-diphenylmethane diisocyanate, 3,3-dimethyl-4,4-diphenylmethane diisocyanate, hexamethylene diisocyanate, isophorone diisocyanate, dicyclohexylmethane diisocyanate, and tolylene diisocyanate tri-addition product of trimethylolpropane.

Also, a part of the aforesaid dibasic acid or the dihydric alcohol may be replaced with a tri-valent or higher acid or a tri-hydric or higher alcohol. The polar group and the carbon-carbon unsaturated bond may exist at the terminals or side chains of polyurethane. Preferred polar groups are $CO_2H$, $SO_3Na$, and $SO_3K$.

The polar group can be introduced by 1) a method of using a tri-valent or higher acid or a dibasic group having a polar group in place of the above dibasic group or 2) a method of reacting urethane having an isocyanate group at the terminal and an active hydrogen compound having a polar group, at least one (meth)acryloyl group and at least one hydroxy group.

Synthesis examples of these compounds are disclosed in JP-A-59-174660, JP-A-59-223712, JP-A-60-35322, JP-A-60 119626, JP-A-60-120765, JP-A-61-77134, and JP-A-61-222028. However, the compounds which can be used in this invention are not limited to those synthesized by these examples.

In the embodiment (2) of this invention, if necessary, the magnetic layer of the magnetic recording medium can contain a vinylic monomer which can be polymerized by the irradiation of radiations. The vinylic monomer is a compound having at least one carbon-carbon unsaturated bond in the molecule and examples thereof are (meth)acrylic acid esters, (meth)acrylamides, allyl compounds, vinyl ethers, vinyl esters, vinyl heterocyclic compounds, N-vinyl compounds, styrenes, acrylic acid, methacrylic acid, crotonic acids, itaconic acids, and olefins. In these monomers, the following compounds having two or more methacryloyl groups are preferred. Specific examples of the monomers are (meth)acrylates of polyethylene glycol, such as diethylene glycol di(meth)acrylate, triethylene glycol di(meth)acrylate, tetraethylene glycol di(meth)acrylate, etc.; trimethylolpropane, tri(meth)acrylate, pentaerythritol tetra(meth)acrylate, dipentaerythritol penta(emth)acrylate, dipentaerythritol hexa(meth)acrylate, tris[β-(meth)acryloyloxyethyl] isocyanurate, bis[β-(meth)acryloxyethyl] isocyanurate; reaction products of a polyisocyanurate (e.g., 2,4-tolylene diisocyanate, 2,6-tolylene diisocyanatem, 1,3-xylylene diisocyanate, 1,4- xylylene diisocyanate, 1,5-naphthalene diisocyanate, m-phenylene diisocyanate, p-phenylene diisocyanate, 3,3-dimethylphenylene diisocyanate, 4,4-diphenylmethane diisocyanate, 3,3-dimethyl-4,4-diphenylmethane diisocyanate, hexamethylene diisocyanate, isophorone diisocyanate, dicyclohexylmethane diisocyanate, and a reaction product of tolylene diisocyanate tri-addition product of trimethylolpropane and a hydroxy (meth)acrylate compound (e.g., 2--hydroxyethyl (meth)acrylate (meth)acrylate and 2-hydroxypropyl (meth)acrylate); and di-functional or more poly(meth)-acrylates. These monomers may be used solely or as a mixture thereof. The vinylic monomer may be added from 5 to 40% by weight based on the total weight of the binder resin.

In the embodiment (2) of this invention, the amount of the aforesaid compound having the polar group is from 3 to 25 parts by weight, and preferably from 6 to 15 parts by weight per 100 parts by weight of the ferromagnetic powder and the amount of the ester compound shown by formula (I), (II), or (iii) described above is from 0.1 to 20 parts by weight, and preferably from 5 to 15 parts by weight per 100 parts by weight of the ferromagnetic powder. However, the aforesaid ester compound is used in an amount of less than the total amounts of the binder resins.

In the embodiment (2) of this invention, the polar group such as $-SDO_3M^3$, $-COOM^3$, or $-PO_3(M^3)_2$ (wherein $M^3$ represents a hydrogen atom, an alkali metal or an ammonium group) of the aforesaid binder resin has a large absorptive power to the surface of the ferromagnetic powder and hence strongly adsorbs onto the surface of the ferromagnetic powder in the magnetic coating composition, thereby the dispersion of the ferromagnetic powder is accelerated to secure the stability of the dispersion and to provide a magnetic recording medium having the magnetic layer of high smoothness, wherein the ferromagnetic powder is highly dispersed, and having excellent electromagnetic characteristics.

In general, as the surface of a magnetic layer is smoother, the running durability of the magnetic recording medium is more deteriorated and the tendency is severer under a high-temperature condition. Conventional techiques can not sufficiently solve such problems.

On the other hand, the running durability of the magnetic recording medium of this invention can be sufficiently secured by the effect of the aforesaid ester compound shown by formula (I), (II), or (III) described above.

Furthermore, in the embodiment (2), the magnetic layer formed by coating the coating composition containing a ferromagnetic powder and the aforesaid binder resin having at least one carbon-carbon unsaturated bond in the molecule on a non-magnetic support is cured by the irradiation of radiation (radiation curing type) and thus since the curing reaction does not occur in the coating composition, the properties of the coating composition are stably kept. Also, for curing the magnetic layer, a heating step is unnecessary. The magnetic recording medium of this invention has such a merit in production step. In particular, in the case of using a radiation curing type binder resin, a lubricant is scattered by heat generated in the magnetic layer at the irradiation of radiations and are liable to attach to the magnetic recording medium to cause the increase of drop out. On the other hand, since the aforesaid ester compound for use in this invention shown by formula (I), (II), or (III) has a branch and a properly large size of molecule by the specific carbon atom number, the ester compound is reluctant to scatter off by the heat generated upon the irradiation of radiations and the occurrence of the aforesaid problem accompanied by the use of a conventional radiation curing type binder resin is reduced.

In the embodiment (2) of this invention, it is preferred to apply radiations onto the magnetic layer after coating the magnetic coating composition and applying a calender treatment onto the layer. Radiations can be further applied again to the magnetic layer.

As radiations being applied to the magnetic layer in this invention, electron beams, $\beta$-rays, $\gamma$-rays, ultraviolet rays, etc., can be used but electron beams are preferably used.

In the case of using electron beams, as an electron beam accelerator, a scanning type system or a non-scanning type system can be employed.

For the electron beams, the acceleration voltage is from 100 KV to 500 KV, and preferably from 150 KV to 300 KV and the absorbed does is from 1 to 20 Mrads, and preferably from 2 to 10 Mrads. If the acceleration voltage is lower than 100 KV, the transmission energy is deficient while if the acceleration voltage is over 500 KV, the energy efficiency for the curing polymerization is reduced, which is economically undesirable. Also, if the absorbed dose is less than 1 Mrad, the curing reaction insufficiently occurs and the tough magnetic layer is not obtained, while if the absorbed does is above 20 Mrads, the energy efficiency being used for curing is reduced, the irradiated material generates heat, and the support is deformed.

In this invention, for preventing the deformation of the support at the irradiation of the radiations, it is preferred to cool the support of the magnetic recording medium by supporting the support with a cooling drum during the irradiation.

As the material for the non-magnetic support being used in this invention, there are polyesters such as polyethylene terephthalate, polyethylene 2,6-naphthalate, etc.; polyolefins such as polyethylene, polypropylene, etc,; cellulose derivatives such as cellulose triacetate; etc.; and resins such as polycarbonate, polyimide, polyamidoimide, etc. If necessary, the support may be metallized by a metal such as aluminum, etc.

Also, the form of the non-magnetic support may be a film, a tape, a sheet, a disk, a card, or a drum and various materials are selected according to the form.

The thickness of the support in this invention is from 3 to 100 μm, and is preferably from 3 to 20 μm for a magnetic recording tape and is preferably from 20 to 100 μm for a magnetic recording disk.

The support for use in this invention may have a so-called back coat opposite to the magnetic layer for the purposes of static prevention, transfer prevention, prevention of the occurrence of wow flutter, improvement of the strength of the magnetic recording medium, and matting of the back surface.

The content of the whole binder resins in the magnetic layer of the magnetic recording medium is usually from 10 to 100 parts by weight, and preferably from 20 to 40 parts by weight per 100 parts by weight of the ferromagnetic powder.

It is preferred that the magnetic layer of the magnetic recording medium of this invention further contains inorganic particles having a Mohs' hardness of at least 5 as an abrasive.

There is no particular restriction on the aforesaid inorganic particles if the Mohs' hardness is at least 5. Examples of the inorganic particles having a Mohs' hardness of at least 5 are $Al_2O_3$ (Mohs' hardness 9). TiO (Mohs' hardness 7), $SnO_2$ (Mohs' hardness 6.5), $SiO_2$ (Mohs' hardness 7), $SnO_2$(Mohs' hardness 6.5), $Cr_2O_3$ (Mohs' hardness 9), and $\alpha\text{-}Fe_2O_3$ (Mohs' hardness 5.5). They can be used solely or as a mixture of them.

The inorganic particles having a Mohs' hardness of at least 8 are particularly preferred.

If inorganic particles having a Mohs' hardness of lower than 5 are used, the inorganic particles are liable to fall from the magnetic layer, the particles scarcely show abrasing action for a magnetic head, thereby clogging of the head is liable to occur, and also the running durability of the magnetic recording medium becomes poor.

The content of the inorganic particles is usually from 0.1 to 20 parts by weight, and preferably from 1 to 10 parts by weight per 100 parts by weight of the ferromagnetic powder.

It is desirable that the magnetic layer further contains carbon black (in particular, carbon black having a mean particle size of from 10 to 300 n.m.), etc., in addition to the aforesaid inorganic particles.

Then, the production process of the magnetic recording medium of this invention is explained.

First, a magnetic coating composition is prepared by kneading the ferromagnetic powder, the binder resin, the ester compound shown by formula (I), (II), or (III), and, if necessary, other fillers and additives with a solvent. As a solvent for kneading, solvents which are usually used for the preparation of ordinary magnetic coating compositions can be used.

Examples of the organic solvent are ketone series solvents such as acetone, methyl ethyl ketone, methyl isobutyl keton, cyclohexanone, etc.; ester series solvents such as methyl acetate, ethyl acetate, butyl acetate, ethyl lactate, acetic acid glycol monoethyl ether, etc.; ether series solvents such as ethyl ether, glycol dimethyl ether, glycol monoethyl ether, dioxane, tetrahydrofuran, etc.; aromatic hydrocarbons such as benzene, toluene, xylene, etc.; and chlorinated hydrocarbons such as methylene chloride, ethylene chloride, carbon tetrachloride, chloroform, ethylenechlorohydrin, dichlorobenzene, etc.

There is no particular restriction of kneading, and the addition order of can be properly selected.

In the case of preparing the magnetic coating composition, known additives such as a dispersing agent, an antistatic agent, etc., can be used together.

Examples of the dispersing agent are fatty acids having from 12 to 22 carbon atoms, the salts or the esters of the fatty acids, the aforesaid compounds a part or the whole of the hydrogens of which are replaced with fluorine atom(s), the amides of the aforesaid fatty acids, aliphatic amines, higher alcohol, polyalkylene oxides, alkylphosphoric acid esters, alkylboric acid esters, sarcosinates, alkyl ether esters, trialkyl polyolefins, oxy quaternary ammonium salts and lecithin.

In the case of using a dispersing agent, the amount thereof is usally from 0.1 to 10 parts by weight per 100 parts by weight of the ferromagnetic powder being used.

Examples of the antistatic agents are conductive fine powders such as carbon black, carbon black graft polymer, etc.; natural surface active agents such as saponin; nonionic surface active agents such as alkylene oxide series surface active agents, glycerol series surface active agents, and glycidol series surface active agents; cationic surface active agents such as higher alkylamines, quaternary ammonium salts, salts of heterocyclic compounds such as pyridine, etc., phosphoniums, and sulfoniums; anionic surface active agents containing an acid group such as carboxylic acid, phosphoric acid, sulfuric acid ester group, a phosphoric acid ester group, etc.; and amphoteric surface active agents such as amino acids, aminosulfonic acids, sulfuric acid esters or phosphoric acid esters of amino alcohol.

When the aforesaid conductive fine powder is used as an antistatic agent, the amount thereof is from 0.1 to 10 parts by weight per 100 parts by weight of the ferromagnetic powder and when the surface active agent is used as an antistatic agent, the amount thereof is from 0.12 to 10 parts by weight per 100 parts of the ferromagnetic powder.

In addition, the aforesaid additives such as the dispersing agent, the antistatic agent etc., are not described to have the aforesaid effect in strict meanings and, for example, a dispersing agent also can function as a lubricant or an antistatic agent. Thus, the effect and action of the compounds classified above are not, as a matter of course, limited to the classified matter. When a material having plural effects and actions is used, the addition amount thereof is preferably determined o considering the effects and actions.

The magnetic coating composition thus prepared is coated on the aforesaid non-magnetic support. The coating composition may be coated on the non-magnetic support directly or through an interlayer such as an adhesive layer. The interlayer may be a single layer composed of an adhesive or a composite layer composed of non-magnetic fine particles such as carbon dispersed in a binder.

The binder for the interlayer containing carbon can be optionally selected from various binders being usually used for magnetic layers. In the case of the using the interlayer containing carbon, the grain size of carbon is preferably from 10 to 50 n.m. and the ratio of binder/carbon is preferably from 10/10 to 100/150 by weight ratio. The thickness of the interlayer is preferably from 0.1 to 2 μm in the case of a single adhesive layer and is preferably from 0.5 to 4 μm in the case of a composite layer containing a non-magnetic powder.

The interlayer may further contain a lubricant same as or different from those for the magnetic layer.

The details of the dispersion method of binders, the ferromagnetic powders, etc., and the coating method of the magnetic coating composition are described in JP-A-54-46011 and JP-A-54-21805.

The thickness of the magnetic layer thus coated is generally from about 0.5 to 10 μm, and preferably from 0.7 to 6.0 μm as dry thickness.

When the magnetic recording medium is used as tape-form medium, the magnetic layer coated on the non-magnetic support is usually subjected to a treatment of Orienting the ferromagnetic powder in the magnetic layer, that is, a magnetic orientation treatment and then dried. Also, when the magnetic recording medium is used as a disk-form medium, the magnetic layer is subjected to a non-orienting treatment by magnetic field for removing the anisotropy of the magnetic characteristics. Thereafter, the magnetic layer is, if necessary, subjected to a surface smoothening treatment.

Then, the novel features and effects of this invention are practically explained by the following examples, in which the "parts" are all "by weight".

EXAMPLE 1

| | |
|---|---|
| Co-containing FeO$_x$ Powder (x = 1.4, mean particle size 0.3 μm × 0.03 μm) | 100 parts |
| Vinyl Chloride Series Copolymer (one of two kinds shown in Table 1) | 13 parts |
| Polyester Series Polyurethane Resin (one of three kinds shown in Table 2) | 4 parts |
| Cr$_2$O$_3$ | 5 parts |
| Carbon Black (Asahi #80, trade name made by Asahi Carbon K.K.) | 5 parts |
| Ester Compound (one of six kinds shown in Table 3) | 7.5 parts |
| Oleic Acid | 1 part |
| Methyl Ethyl Ketone | 72 parts |
| Toluene | 72 parts |
| Methyl Isobutyl Ketone | 36 parts |

The aforesaid components were kneaded in a ball mill for 10 hours to uniformly disperse the ferromagnetic powder. Thereafter, 7 parts of polyisocyanate (Corronate 3041, trade name, made by Nippon Polyurethane K.K.) was added thereto followed by kneading for 1 hour to provide a magnetic coating composition.

Then, the coating composition was coated on a polyethylene terephthalate support having a thickness of 75 μm, a width of 500 mm, and a surface roughness (Ra value) of 0.028 μm (cut off value 0.25 μm) to form a magnetic layer. After drying, the magnetic layer was subjected to a surface smoothening treatment by calender. The thickness of the magnetic layer was 2.5 μm. The magnetic recording medium thus obtained was cut into a floppy disk of 3.5 inches in diameter to provide a test sample.

TABLE 1

| Vinyl Chloride Series Copolymer | | |
|---|---|---|
| A: | Vinyl chloride | 77% by weight |
| | —SO$_3$Na | 0.8 by weight |
| | Epoxy group | 3.9 by weight |
| | Hydroxy group | 0.5 by weight |
| B: | Vinyl chloride | 80% by weight |
| | Vinyl acetate | 15 by weight |
| | Vinyl alcohol | 5 by weight |
| | Polymerization degree | 400 by weight |

TABLE 2

| Polyester Series Polyurethane Resin | | |
|---|---|---|
| A: | Condensed Series Polyester | |
| | —SO$_3$Na | 2 in average per one molecule |
| | Weight average molecular weight | 40,000 |
| | Number average molecular weight | 25,000 |
| | Initial modulus of elasticity | 100 kg/mm$^2$ |
| | Breaking strength | 8 kg/mm$^2$ |
| | Breaking extension | 150% |
| B: | Condensed Series Polyester | |
| | Polar group | none |
| | Weight average molecular weight | 40,000 |
| | Number average molecular weight | 25,000 |
| | Initial modulus of elasticity | 100 kg/mm$^2$ |
| | Breaking strength | 8 kg/mm$^2$ |
| | Breaking extension | 150% |
| C: | Condensed Series Polyester | |
| | —COOH | 1.5 in average per one molecule |
| | Weight average molecular weight | 40,000 |
| | Number average molecular weight | 25,000 |
| | Initial modulus of elasticity | 100 kg/mm$^2$ |
| | Breaking strength | 8 kg/mm$^2$ |
| | Breaking extension | 150% |

TABLE 3

| Ester Compound | |
|---|---|
| A: | Isostearyl stearate (methyl branch) |
| B: | Isopalmityl stearate (Methyl branch) |
| C: | Isostearyl behenate (methyl branch) |
| D: | Isolauryl stearate (methyl branch) |
| E: | Oleyl Oleate |
| F: | Palmityl stearate (2-position branched) |

By using the combinations of the binder resins and the ester compounds shown in Table 4 below, 11 samples of magnetic recording media were prepared under the aforesaid conditions.

TABLE 4

| Sample No. | Vinyl Chloride Series Copolymer | Polyester Series Polyurethane Resin | Ester Compound |
|---|---|---|---|
| 1 | A | A | A |
| 2 | A | B | A |
| 3 | A | C | A |
| 4 | B | A | A |
| 5 | B | C | A |
| 6 | A | A | B |
| 7 | A | A | A |
| 8 | A | A | C |
| 9 | A | A | D |
| 10* | A | A | E |
| 11* | A | A | F |

*Comparative samples.

On each of the samples thus obtained, the running durability, the sticking property to a magnetic head, and the smoothness of the surface of the magnetic layer were measured under the following conditions.

(1) Running Durability

The running durabilities under a high-temperature high-humidity condition (70° C., 80% RH) and a low-temperature condition (5° C., 50% RH) and the running durability in the temperature humidity cycle (thermocycle) shown below were measured using a 3.5 inch floppy disk drive (OA-D32W, made by Sony Corporation) by continuously driving each sample of 600 r.p.m. and they were shown by the pass number until the output reduced to 80% of the initial value.

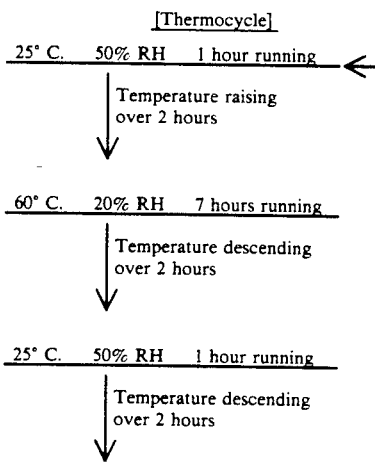

-continued

[Thermocycle]

```
5° C.  50% RH  7 hours running
                    Temperature raising
                    over 2 hours
```

(2) Initial Motive Torque

After driving each sample for 30 minutes by a 3.5 inch floppy disk drive (OA-D32W, made by Sony Corporation) under 40° C. and 80% RH, the driving machine was stopped for 10 minutes. Then, the voltage for the machine was gradually increased and the torque at the initiation of the rotation of the disk (initial motive torque) was measured.

(3) Smoothness of Magnetic Layer Surface

The center line average roughness (Ra) was measured by a light interference method using a Digital Optical Profimeter (made by WYKO) under a condition of cut off value of 0.25 μm.

The results of the evaluations obtained by the aforesaid measurements are shown in Table 5 below.

TABLE 5

| Sample No. | Running Durability*1 | | | Initial Torque (g · cm) | Ra (μm) |
|---|---|---|---|---|---|
| | 70° C., 80% RH | Thermocycle | 5° C., 50% RH | | |
| 1 | >5000 | >5000 | >5000 | 67 | 0.005 |
| 2 | 4500 | 4000 | 4500 | 70 | 0.08 |
| 3 | 4500 | 4300 | 4300 | 70 | 0.05 |
| 4 | 4300 | 4100 | 4200 | 73 | 0.09 |
| 5 | 4300 | 4000 | 4300 | 71 | 0.08 |
| 6 | >5000 | 4800 | >5000 | 65 | 0.05 |
| 7 | >5000 | 4800 | >5000 | 67 | 0.05 |
| 8 | >5000 | >5000 | >5000 | 70 | 0.05 |
| 9 | >5000 | 4700 | 4800 | 71 | 0.05 |
| 10*1 | 1800 | 2000 | 2000 | 90 | 0.05 |
| 11*2 | 2500 | 2500 | 2000 | 100 | 0.05 |

*1Number of passes ($\times 10^4$)
*2Comparative samples

As is clear from the results shown in the above table, the magnetic recording media of this invention each containing a polymer having a polar group, such as vinyl chloride copolymer A having —SO$_3$Na, polyester series polyurethane resin A having —SO$_3$Na, or polyester series polyurethane resin C having —COOH as the binder resin and the ester compound shown by formula (I) having a methyl branch at the alcohol moiety in the magnetic layer show the dunning durability of more than 40,000,000 passes (Sample Nos. 1 to 9). On the other hand, in the comparative samples (Sample Nos. 10 and 12), the running durability was 25,000,000 passes only.

In particular, by comparing the measurement results of Sample Nos. 10 and 11 with the measurement results of Sample Nos. 1 and 6 to 9 of this invention, it is seen that even in the case of using the polymer having a polar group for use in this invention as the binder resin, a sufficient running durability is not obtained when an ester compound having no methyl branch at the alcohol moiety is used as a lubricant.

It can be also seen that the magnetic recording media of this invention show low initial motive torque, which shows excellent lubricating property at the surface of the magnetic layers.

EXAMPLE 2

The following components were kneaded in a ball mill for 20 hours.

| | |
|---|---|
| Ferromagnetic Fe alloy powder (Hc 1500 Oe, crystal size 130 Å) | 100 parts |
| Binder resin | |
| Vinyl chloride series copolymer series acrylate (—COOH content $10^{-4}$ equivalent/g, molecular weight 20,000, mean content of acryloyl group $5 \times 10^{-4}$ equivalent/g) | 13 parts |
| Urethane acrylate (—SO$_3$Na content $5 \times 10^{-5}$ equivalent/g, molecular weight 10,000, mean content of acryloyl group $10^{-3}$ equivalent/g) | 8 parts |
| Ester compound (isohexadecyl isostearate, l = n = 7) | 10 parts |
| Al$_2$O$_3$ (mean particle size 0.5 μm) | 10 parts |
| Carbon black (mean particle size 30 mμ) | 3 parts |
| Methyl ethyl ketone | 80 parts |
| Toluene | 80 parts |

After kneading, the coating composition thus formed was coated on a polyethylene terephthalate support of 75 μm in thickness using a doctor blade at a dry thickness of 2 μm and after drying for one minute at 100° C., the magnetic layer thus formed was subjected to a surface smoothening treatment by calender. Then, after irradiating the magnetic layer with electron beams at an acceleration voltage of 165 KV and a beam current of 6 mA such that the absorbed does became 7 Mrads, the magnetic recording medium obtained was cut into a floppy disk of 3.5 inches in thickness.

COMPARATIVE EXAMPLE 1

By following the same procedure as in Example 2 except that n-hexadecyl n-stearate was used as the ester compound, a 3.5 inch floppy disk was prepared as a comparative sample of a magnetic recording medium.

COMPARATIVE EXAMPLE 2

By following the same procedure as in Example 2 except that isoamyl stearate (l=2) was used as the ester compound, a 3.5 inch floppy disk was prepared as a comparative sample of magnetic recording medium.

COMPARATIVE EXAMPLE 3

By following the same procedure as in Example 2 except that n-hexadecyl hexanate was used as the ester compound, a 3.5 inch floppy disk was prepared as a comparative sample of magnetic recording medium.

EXAMPLE 3

By following the same procedure as in Example 2 except that a vinyl chloride copolymer series acrylate having $2 \times 10^{-7}$ equivalent/g of —SO$_3$Na in place of —COOH as the polar group was used in place of the vinyl chloride copolymer series acrylate in the binder resins, a 3.5 inch floppy disk was prepared as a sample of magnetic recording medium.

EXAMPLE 4

By following the same procedure as in Example 2 except that the vinyl chloride copolymer series acrylate having $8 \times 10^{-4}$ equivalent/g of SO$_3$Na in place of —COOH as the polar group was used in place of the vinyl chloride copolymer series acrylate forming the binder resins, a 3.5 inch floppy disk was prepared as a sample of magnetic recording medium.

EXAMPLE 5

By following the same procedure as in Example 2 except that the vinyl chloride copolymer series acrylate having $1 \times 10^{-5}$ equivalent/g of —SO$_3$Na in place of —COOH as the polar group was used in place of the vinyl chloride copolymer series acrylate forming the binder resins, a 3.5 inch floppy disk as a sample of magnetic recording medium.

EXAMPLE 6

By following the same procedure as in Example 2 except that the vinyl chloride copolymer series acrylate having $4 \times 10^{-4}$ equivalent/g of —SO$_3$Na in place of —COOH as the polar group was used in place of the vinyl chloride copolymer series acrylate forming the binder resins, a 3.5 inch floppy disk was prepared as a sample of magnetic running medium.

EXAMPLE 7

By following the same procedure as in Example 2 except that isohexadecyl stearate (l=1) was used as the ester compound, a 3.5 inch floppy disk was prepared as a sample of magnetic recording medium.

EXAMPLE 8

By following the same procedure as in Example 2 except that n hexadecyl isostearate (n=7) was used as the ester compound, a 3.5 inch floppy disk was prepared as a sample of magnetic recording medium.

EXAMPLE 9

By following the same procedure as in Example 2 except that n-oleyl stearate (n=6) was used as the ester compound, a 3.5 inch floppy disk was prepared as a sample of magnetic recording medium.

EXAMPLE 10

By following the same procedure as in Example 2 except that isooctadecyl n-laurate (l=8) was used as the ester compound, a 3.5 inch floppy disk was prepared as a sample of magnetic recording medium.

With respect to each of the 3.5 inch floppy disk type magnetic recording media thus obtained, the initial output (2F output) and the running durability in the thermocycle as in Example 1 were evaluated.

In this case, however, the evaluation of the aforesaid running durability was made by continuously driving each sample using a 3.5 inch floppy disk drive (OA-D32W, made by Sony Corporation) at 300 r.p.m., and shown by the pass number until the output reduced to 80% of the initial value.

In addition, the value of the initial 2F output was shown by the relative value when the sample of Example 2 was 100%.

The results of the evaluations are shown in Table 6 below.

TABLE 6

| | Initial 2F Output (%) | Running Durability*[1] |
|---|---|---|
| Example 2 | 100 | 3000 |
| Comparative Example 1 | 97 | 1500 |
| Comparative Example 2 | 98 | 1000 |
| Comparative Example 3 | 99 | 900 |
| Example 3 | 96 | 3000 |
| Example 4 | 99 | 3000 |
| Example 5 | 110 | 3000 |
| Example 6 | 108 | 3000 |
| Example 7 | 101 | 3000 |
| Example 8 | 99 | 3000 |
| Example 9 | 103 | 3000 |
| Example 10 | 99 | 3000 |

*[1]Number of passes ($\times 10^4$)

As is clear from the above results, it can be seen that in the case of using the ester compound having no branch (Comparative Examples 1 to 3), the running durability is considerably lower than the case of using the ester compound having branch and a carbon atom number in a specific range (Example 2).

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having provided thereon a magnetic layer mainly composed of a ferromagnetic powder and a binder resin comprising (i) a polymer having at least one polar group selected from —SO$_3$M$^1$, —OSO$_3$M$^1$, —COOM$^1$,

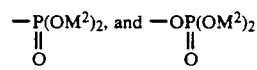

wherein M$^1$ represents a hydrogen atom, Li, Na, or NR$_4$ (wherein R represents a hydrogen atom, an alkyl group, an alkenyl group, or an alkanol group), and M$^2$ represents a hydrogen atom, Li, Na, an alkyl group, or NR$^4$ (wherein R has the same significance as defined above); or (ii) a compound having at least one polar group selected from —SO$_3$M$^3$, —COOM$^3$, and —PO$_3$(M$^3$)$_2$ (wherein M$^3$ represents a hydrogen atom, an alkali metal, or an ammonium group) and containing at least one carbon-carbon unsaturated bond in the molecule, said magnetic layer containing at least one ester compound represented by following formula (I), (II), or (III), and when the binder resin comprises the compound (ii), the magnetic layer is irradiated by radiations:

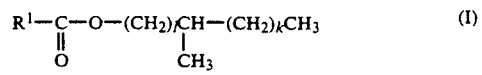

-continued

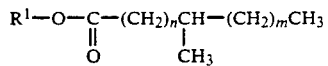

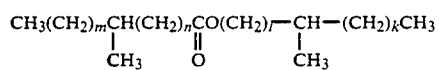

wherein $R^1$ represents a straight chain or branched alkyl group having from 7 to 29 carbon atoms or a straight chain or branched alkenyl group having from 7 to 29 carbon atoms; l, k, m, and n represents an integer; and n each is at least 2, and the sum of n and m and the sum of k and l are from 7 to 33.

2. The magnetic recording medium as claimed in claim 1, wherein the binder resin comprises the polymer (i) and the ester compound is represented by formula (I).

3. The magnetic recording medium as claimed in claim 2, wherein the center line mean roughness Ra (cut off value 0.25 μm) of the surface of the magnetic layer by a light interference method is not more than 100 mm.

4. The magnetic recording medium as claimed in claim 1, wherein the binder resin comprises the compound (ii).

5. The magnetic recording medium as claimed in claim 4, wherein the compound (ii) is a vinyl chloride series copolymer or a urethane series resin and contains the polar group in an amount of from $10^{-7}$ to $10^{-3}$ equivalent per gram.

6. The magnetic recording medium as claimed in claim 4, wherein the carbon atom number of $R^1$ in formula (I) or (II) is from 13 to 21.

* * * * *